United States Patent [19]

Weigele et al.

[11] 3,852,842

[45] Dec. 10, 1974

[54] STATIONARY WASHING DEVICE FOR MOTOR VEHICLES PASSING THERETHROUGH

[76] Inventors: Gebhard Weigele, Am Schonblick 1a, Tafertingen; Johann Sulzberger, Radegundis 11, Augsburg, both of Germany

[22] Filed: June 11, 1973

[21] Appl. No.: 368,666

[30] Foreign Application Priority Data

June 12, 1972 Germany............................ 2228567

[52] U.S. Cl. .............................. 15/21 D, 15/DIG. 2
[51] Int. Cl. ............................................... B60s 3/06
[58] Field of Search ............. 15/DIG. 2, 21 D, 21 E, 15/53

[56] References Cited
UNITED STATES PATENTS

| | | | |
|---|---|---|---|
| 3,570,034 | 3/1971 | Lanfrankie.......................... | 15/21 D |
| 3,601,833 | 8/1971 | Takeuchi............................. | 15/21 E |
| 3,737,934 | 6/1973 | Skweres............................... | 15/21 E |

FOREIGN PATENTS OR APPLICATIONS

| | | | |
|---|---|---|---|
| 1,243,230 | 8/1971 | Great Britain................... | 15/DIG. 2 |

*Primary Examiner*—Edward L. Roberts
*Attorney, Agent, or Firm*—Woodhams, Blanchard & Flynn

[57] ABSTRACT

Washing device for motor vehicles. At least two rotatable brushes are pendently supported respectively from two carriages which carriages are in turn supported on and guided by parallel arranged rails. Said rails are located above the normal path of the motor vehicle through the washing device and are aligned at a substantial angle with respect to the direction of travel of the motor vehicle passing therethrough, said rails angling away from said motor vehicle in the direction of travel of the one of said two brushes which is closer to the front end of said motor vehicle as it passes therethrough. Drive means effects simultaneous movement of said brushes starting at opposite ends of their respective rails toward the other ends thereof, said above-mentioned one of said brushes washing the front end of the motor vehicle during such travel. Said brushes, on reaching said respective other ends of said rails, are now in a position to engage the sides of said motor vehicle for washing of same. The traction device is in the meantime disconnected and the brush is urged against the sides of the motor vehicle by appropriate resilient devices. As said brushes pass the sides of said motor vehicle said resilient devices return same to their initial positions, the other of said brushes at the same time washing the rear of the vehicle. The angular relationship of said rails to the direction of travel is chosen with respect to the speed at which the motor vehicle is conducted through the washing device so that the component in such direction of the one of said brushes which at a given time engages an end of said motor vehicle is equal to the speed of the motor vehicle therethrough.

6 Claims, 5 Drawing Figures

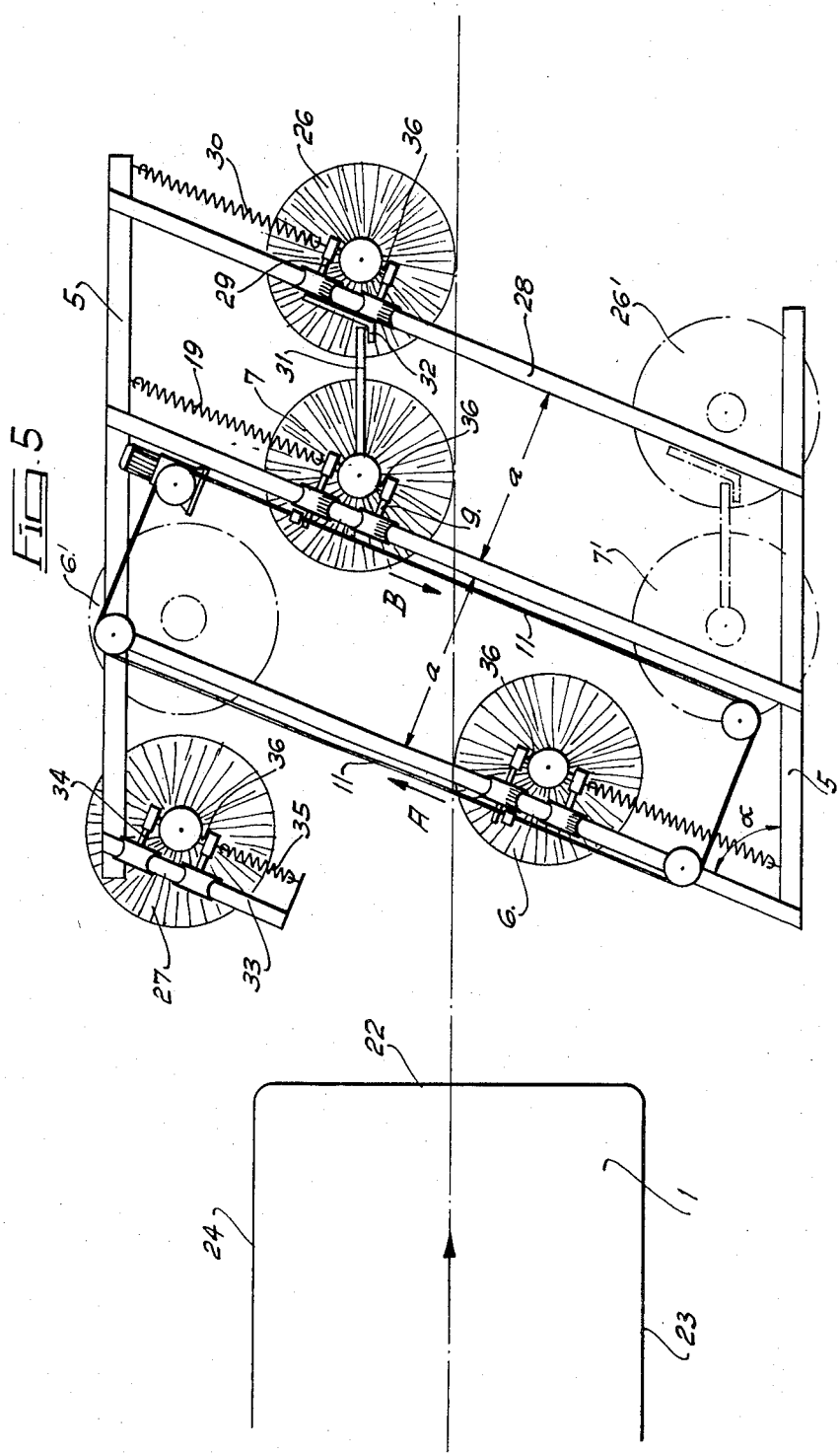

STATIONARY WASHING DEVICE FOR MOTOR VEHICLES PASSING THERETHROUGH

FIELD OF THE INVENTION

The invention relates to a stationary washing device for motor vehicles which are caused to pass therethrough. Said device includes two vertical washing brushes which are each supported on a guide rail which latter is arranged in an inclined manner with respect to the direction of travel. Said brushes are supported on carriages and are so guided that the first brush washes first the front and then one side of the vehicle and the second brush washes first the other side of the vehicle and then the rear.

BACKGROUND OF THE INVENTION

In a known washing device of this general type one single guide rail is usually provided for the carriages of the two brushes, which guide rail is relatively long and is arranged to slope at an angle of approximately 45° with respect to the direction of movement of the vehicle. This washing device has the important disadvantage that it requires a large space between successive vehicles, not only that caused by the considerable length of the inclined guide rail but also by the fact that after the rear has been washed the two washing brushes must be returned into the initial position from the one rail end to the other rail end.

Further, this washing device requires an expensive control for the washing brushes because the movement of each washing brush occurs separately and independently from that of the other brush.

The basic purpose of the invention is to produce a stationary washing device of the general type referred to above, which washing device permits a shortened distance between the vehicles and therefore a shortened washing space and which also permits a simplification of the brush control.

This purpose is attained according to the invention substantially by providing two guide rails parallel to one another and by supporting one brush on each rail, by locating in the beginning position the two brushes at opposite ends of the rails, and by connecting the brush carriages by a continuous, drivable tension member to effect the desired oppositely directed movement thereof.

BRIEF DESCRIPTION OF THE DRAWINGS

The details of the invention and their advantages are explained more in detail hereinafter in connection with exemplary embodiments illustrated in the drawings; in which

FIG. 5 is a top view of a further embodiment.

DETAILED DESCRIPTION

Figure 1:
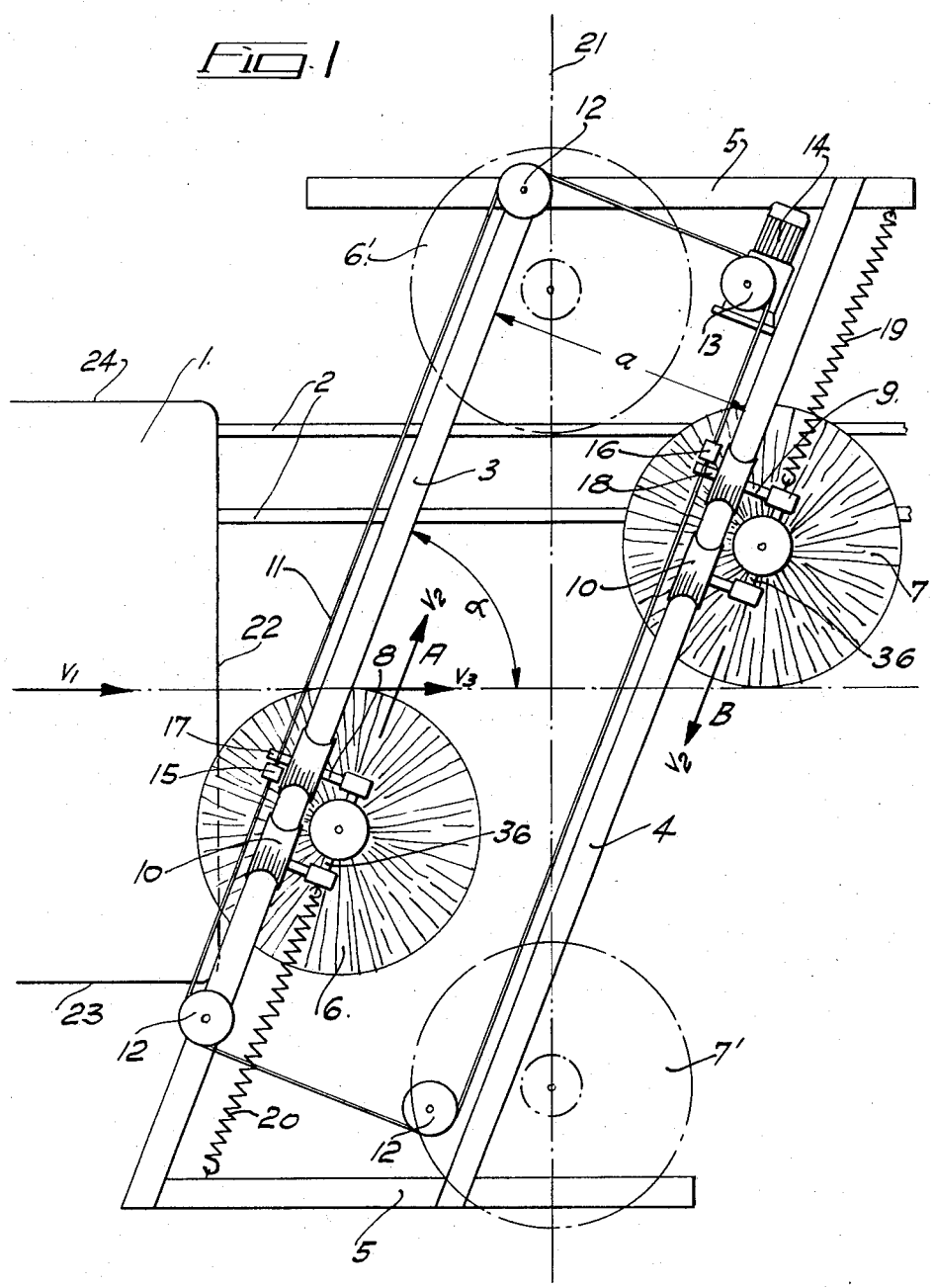
FIG. 1 is a top view of a stationary washing device.

The numeral 1 in the drawings identifies a motor vehicle which is to be washed and which is moved with a speed $V_1$ in the direction of the arrow. This vehicle is moved by a conveyor belt which advantageously has a lateral guide 2 for the left wheels of the vehicle. The washing device has two horizontal guide rails 3 and 4 which are arranged parallel to one another and are inclined at an angle $\alpha$ to the direction of movement of the vehicle, and which are connected fixedly at the ends. In the illustrated embodiment, said rails are connected to lateral posts 5 so that these together with the rails 3, 4 form a stationary bridge. The numerals 6 and 7 identify vertical washing brushes which are pendently supported on carriages 8, 9. The carriages are supported on the rails 3, 4 by means of wheels 10, which rails at the same time are a guide for said wheels. As can be seen from FIG. 1, the two brushes 6 and 7 are provided in the beginning position in opposite ends of the rails 3, 4. For the oppositely directed movement of these brushes, their carriages 8 and 9 are connected by a continuous traction member 11. Said traction member is guided over guide rollers 12 and a drive roller 13 which is driven by an electric motor 14 through any suitable gearing. The continuous traction member which may consist of a chain or a rope, has catches 15, 16 which cooperate with stops 17, 18 arranged on the carriages 8, 9 in such a manner that the two brush carriages are moved along by the catches only in the one direction of movement indicated by the arrows A and B. The movement of the carriages 8, 9 in the reversed direction is effected by tension springs 19, 20 which engage at one end of each thereof the carriages 9 and 8, respectively, and at the other ends one respective post 5.

Figure 2:
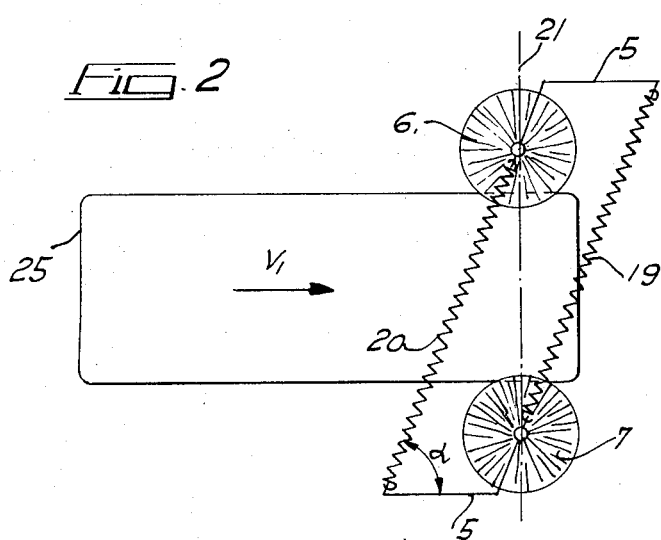
FIGS. 2 to 4 show the operation of this washing device in connection with a motor vehicle passing therethrough.

In the advantageous embodiment illustrated in FIG. 1, the angle of inclination $\alpha$ of the guide rails 3, 4 is so selected with respect to the direction of travel that the two brushes 6, 7 are located during the washing of the vehicle sides approximately in a vertical plane which is positioned perpendicularly to the direction of travel, which plane is indicated at 21 in FIGS. 1 and 2. In this position the two brushes are indicated in dash-dotted lines at 6', 7' in FIG. 1.

OPERATION

This new washing device operates as follows:

The motor vehicle moved by the conveyor belt meets with its front 22 the first brush 6. As soon as the vehicle front contacts this brush, the motor 14 is started. This starting may be initiated in various ways, for example, by electrical power means (active power of the brush drive motor) or by mechanical means (torque or rotational speed measurement of the brushes) or also by distance means with tracer control. The brush 6 is then moved on the stationary guide rail 3 in direction A at a speed $V_2$. This speed depends on the vehicle speed $V_1$ and the angle of inclination $\alpha$. This speed $V_2$ is selected so that its component $V_3$ corresponds in the direction of movement of the vehicle with its speed $V_1$. The smaller the angle $\alpha$, the smaller is also the speed $V_2$ so that not only is a more intensive front washing of the vehicle achieved but also a greater distance between successive vehicles is required. In order to make possible short washing halls, the angle $\alpha$ must be chosen relatively large, as is illustrated.

Figure 3:
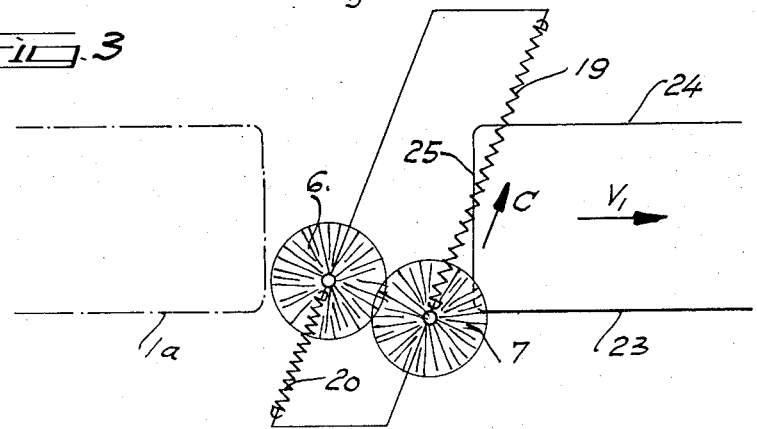
Figure 4:
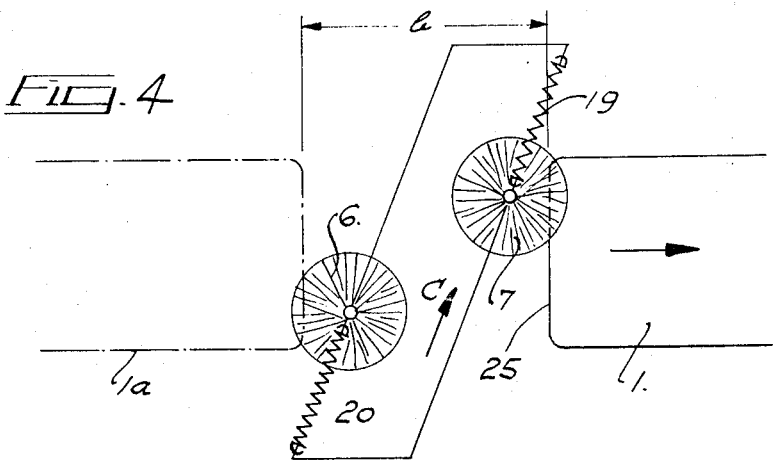

By the afore-described drive of the traction member 11 the brush 6 is moved over the entire vehicle front 22 into the position indicated at 6', while at the same time the brush 7 carries out an oppositely directed movement in the direction B on the rail 4 and reaches the operating position 7'. Both brushes are then in the operating position for washing the longitudinal sides 23 and 24 of the vehicle. As soon as the brushes have reached this position, after a suitable time unit has passed the motor 14 is switched over by means of a timing relay so that it now drives the traction member 11 in the opposite direction through the roller 13. The catches 15, 16 are thereby returned into their initial position as shown in FIG. 1. The tension springs 19 and 20 now become effective and act to press the two brushes 7 and 6 against the longitudinal sides of the vehicle 23, 24 as illustrated in FIG. 2. As soon as the first brush 6 has reached the vehicle rear 25, it is returned by the tension of the spring 20 according to FIG. 3 into its normal position according to FIG. 1. When the second brush 7 has finished the washing of the longitudinal side 23 and reaches the rear 25 of the vehicle, it is moved in the inclined direction C by the effect of the tension spring 19, so that the vehicle rear 25 is effectively washed. At the end of this washing step (see FIG. 4) the second brush 7 is also again in its beginning position. FIGS. 3 and 4 illustrate that the distance "b" between successive vehicles 1, 1a is relatively small and that the washing of the following vehicle 1a can according to FIG. 3 begin immediately upon the first brush 6 returning to its normal position in response to the force of spring 20 as above described.

As is illustrated in FIG. 5, it is possible to add to the two vertical washing brushes 6 and 7 of this aforedescribed washing device two further vertical washing brushes 26 and 27. For this purpose a further guide rail 28 is provided parallel to the other rails and the third brush 26 is pendently supported thereon by a carriage 29 which is engaged on one side by a tension spring 30 and on the other side by a catch bar 31 of the carriage 9 of the second brush 7. This catch bar cooperates with a stop 32 which is provided on the carriage 29 in such a manner that during the movement of the second brush 7 in the direction B the third brush 26 is also moved so that both brushes are moved together into the operating position 7', 26'. In this position, these two brushes, which are advantageously driven in opposite directions, wash the longitudinal side 23 of the vehicle. Thereafter brush 7' washes the vehicle rear and same is then also washed by the following brush 26'. In this washing operation each of these brushes is moved idependently from the other one by the tension springs 19 or 30.

As can be seen from FIG. 5, it is further possible to support on a short guide rail 33 a carriage 24 and to pendently support thereon a fourth brush 27. This carriage 34 is held by a tension spring 35 in the operating position illustrated in FIG. 5 and is then during the washing of the vehicle side 24 urged by said spring 35 against this side.

As is indicated in the drawing, each washing brush can advantageously be supported on the associated carriage swingably about a horizontal lateral axis 36 and an emergency cutout (not illustrated) can be provided which is operated if a washing brush has an excessively inclined position.

In order to reduce still further the space required by the washing device of the invention and to further reduce the vehicle spacing, the distance $a$ of the guide rails from one another may be chosen yet smaller than as illustrated, whereby the washing brushes do not only contact one another but can also bear substantially against one another.

It is further advantageous not only to provide two support and guide wheels on each brush carriage, which wheels are arranged on the upper side of the respective guide rails as shown, but also two further similar wheels on the bottom side of the rails which wheels further guide the carriage and prevent any lateral tilting of the carriage relative to the guide rails.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A stationary washing device for vehicles passing therethrough having first and second vertical washing brushes which are each pendently supported on carriages which are in turn movably supported on guide rail means arranged inclined with respect to the direction of travel, said brushes and guide rail means being so arranged that the first brush washes first the front and then one vehicle side and the second brush washes first the other vehicle side and then the rear, comprising the improvement wherein said guide rail means comprises two guide rails parallel with respect to one another and on each rail one of said brushes is supported so that in the beginning position said first and second brushes are located at opposite ends of the rails and wherein oppositely directed movement of said first and second brushes is effected by connecting their respective carriages by a continuous, drivable traction member.

2. The improvement in a washing device according to claim 1, wherein the angle of inclination ($\alpha$) of the guide rails is so selected with respect to the direction of travel that said first and second brushes are positioned during the washing of the vehicle sides approximately in a vertical plane which is positioned perpendicularly to the direction of travel.

3. The improvement in a washing device according to claim 1, including catches which cooperate with stops on said carriages and which are arranged on said traction member and take along said carriages only in the one direction of movement, and further including tension springs engaging said carriages, said tension springs moving said carriages in the opposite direction.

4. The improvement in a washing device according to claim 3, including a further guide rail parallel with the other of said rails, is provided a third vertical brush being pendently supported on an additional carriage which is engaged at one end by another tension spring and at the other end by a catch bar on the carriage for the second brush.

5. The improvement in a washing device according to claim 1, a short guide rail is provided and on said short guide rail a fourth vertical brush is pendently supported from a carriage, which fourth brush is resiliently urged against one vehicle side and washes together with the first brush this vehicle side.

6. The improvement in a washing device according to claim 1, wherein each washing brush is supported on the carriage in a manner to be swingable about a lateral axis and an emergency cutout is provided which is operated when a washing brush has an excessive inclined position.

* * * * *

UNITED STATES PATENT OFFICE
CERTIFICATE OF CORRECTION

Patent No. 3,852,842         Dated December 10, 1974

Inventor(s) Gebhard Weigele and Johann Sulzberger

It is certified that error appears in the above-identified patent and that said Letters Patent are hereby corrected as shown below:

Column 4, line 49; delete "is provided".

Column 4, line 55; after "Claim 1," insert ---wherein---.

Signed and sealed this 11th day of March 1975.

(SEAL)
Attest:

RUTH C. MASON
Attesting Officer

C. MARSHALL DANN
Commissioner of Patents
and Trademarks